United States Patent [19]

McDade

[11] Patent Number: 5,161,485

[45] Date of Patent: Nov. 10, 1992

[54] ANIMAL COLLAR ARRANGEMENT

[75] Inventor: Robert McDade, Downingtown, Pa.

[73] Assignee: Invisible Fence Company, Inc., Berwyn, Pa.

[21] Appl. No.: 828,689

[22] Filed: Jan. 31, 1992

Related U.S. Application Data

[63] Continuation-in-part of Ser. No. 815,976, Dec. 31, 1991.

[51] Int. Cl.⁵ .................. A01K 27/00; A01K 3/00
[52] U.S. Cl. .................... 119/106; 119/29; 340/573
[58] Field of Search ............ 119/29, 106, 108; 54/71; 231/7; 340/573

[56] References Cited

U.S. PATENT DOCUMENTS

| | | | |
|---|---|---|---|
| 2,023,950 | 12/1935 | Carter | 119/29 |
| 2,741,224 | 4/1956 | Putnam | 119/29 |
| 2,800,104 | 7/1957 | Cameron | 119/29 |
| 2,996,043 | 8/1961 | Pettingill | 119/29 |
| 3,589,337 | 6/1971 | Doss | 119/29 |
| 3,753,421 | 8/1973 | Peck | 119/29 |
| 3,980,051 | 9/1976 | Fury | 119/29 |
| 4,202,293 | 5/1980 | Gonda | 119/29 |
| 4,335,682 | 6/1982 | Gouda et al. | 119/29 |
| 4,745,882 | 5/1988 | Yarnall, Sr. | 119/29 |
| 4,794,402 | 12/1988 | Gouda | 119/29 |

FOREIGN PATENT DOCUMENTS 2455843  5/1979  France .

OTHER PUBLICATIONS

Installation Manual of Invisible Fence Company, Inc.

Primary Examiner—John G. Weiss
Attorney, Agent, or Firm—Dann, Dorfman, Herrell & Skillman

[57] ABSTRACT

An animal collar arrangement is provided having an electric shock generator carried on the collar of an animal for producing an electrical shock to the animal under predetermined conditions to control the movement of the animal. The electric shock generator includes a pair of electrodes which are removably insertable into respective receptacle openings on the electric shock generator. The collar for the animal carries the electric shock generator so that the electrodes are positioned to engage the animal. The collar has a pair of holes which are aligned with the receptacle openings in the shock generator. A relatively thin back strip member includes a flexible grommet support strip which holds a pair of grommets in proper position to respectively align with the pair of holes in the collar. The grommet support strip properly positions and holds the grommets within the respective collar holes. The grommets are positioned on the grommet support strip to respectively align with the receptacle openings in the electric shock generator to permit the electrodes to be respectively inserted through the grommets and into the respective receptacle openings. Insertion of the electrodes into the shock generator mounts the electric shock generator on the collar. The grommets are held in respective position within the collar holes by the back strip member to reinforce the collar holes and to insulate the respective electrodes from the collar.

20 Claims, 2 Drawing Sheets

ANIMAL COLLAR ARRANGEMENT

RELATED APPLICATION

This application is a continuation-in-part of pending design patent application Ser. No. 7/815,976 filed on Dec. 31, 1991.

FIELD OF THE INVENTION

The present invention relates to an animal collar arrangement of the type having an electric shock generator carried on an animal collar for administering an electrical shock to the animal under predetermined conditions to control the movement of the animal and, more particularly, to an animal collar arrangement in which a back strip member is provided having insulative grommets for insertion into holes in the animal collar through which electrodes of the electric shock generator are inserted to retain the electric shock generator and the back strip on the animal collar with the grommets in position to insulate the electrodes from the animal collar.

BACKGROUND OF THE INVENTION

A frequent problem attendant with pet ownership is the confinement of an unsupervised pet to a designated area such as the pet owner's yard. Without proper confinement, a pet may run free thereby creating not only the potential for annoying a particular neighbor or even causing damage to a neighboring property, but also the potential for endangering the animal itself.

While some pet owners have resorted to fences and other physical barriers to confine the animal, financial and aesthetic considerations often make physical barriers unacceptable. Depending on the type of fence selected, the cost of fence erection can be quite high. On the other hand, a relatively inexpensive fence may be ineffective at animal containment as well as unsightly.

As an alternative to physical barriers for pet confinement, electronic animal confinement systems have been employed. In a conventional electronic animal confinement system, a transmitter is connected to a wire loop antenna having sufficient length to surround a designated area in which the pet is to be confined, such as the home owner's yard. The antenna may be laid directly on top of the ground or may be buried slightly below ground surface. A relatively low frequency signal in a sub-broadcast range of frequencies is transmitted over the wire loop antenna. In order to confine the animal within the designated area enclosed by the wire loop antenna, an animal collar carrying a signal receiver is placed on the animal. The signal receiver incorporates an electric shock generator which produces an electric shock for transmission to the animal under predetermined conditions. For example, when the animal moves within a selected distance of the wire loop antenna, the signal receiver on the animal collar responds to the signal being transmitted over the wire loop antenna and causes the electric shock generator to administer an electric shock to the animal. Typically, the electric shock produced by the electric shock generator is transmitted to the animal by a pair of electrodes which project from the signal receiver in position to engage the animal.

In certain conventional arrangements, the electrodes also function to attach the signal receiver onto the animal collar. In order to mount the signal receiver on the collar, the electrodes are unscrewed from openings in the signal receiver. Holes in the animal collar are then aligned with the openings in the signal receiver. The electrodes are then inserted through the holes in the animal collar and screwed back into the openings in the signal receiver to thereby attach the signal receiver to the animal collar. One of the drawbacks with this type of arrangement, however, is that wetness on the animal collar has a tendency to short out the electrodes. Another problem is that the collar often exhibits excessive wear and tear at the collar holes.

In accordance with Applicant's invention, a unique animal collar arrangement has been designed which provides proper insulation for the electrodes of an electric shock generator carried on an animal collar while permitting the electric shock generator to be mounted with facility onto the animal collar. Reinforcement of the collar holes is also effected to inhibit tearing or undue wear.

SUMMARY OF THE INVENTION

In accordance with Applicant's invention, an animal collar arrangement is provided having an electric shock generator for producing an electrical shock to an animal under predetermined conditions in order to control the movement of the animal. For this purpose, the electric shock generator includes a pair of output terminals for transmitting the electric shock to the animal. Each output terminal includes a receptacle opening in the electric shock generator and an electrode which is insertable into and removable from the receptacle opening.

Each electrode includes an external post portion which is positioned externally of the electric shock generator for engaging the animal to thereby transmit the electric shock to the animal. Each electrode also includes a fastener portion for insertion into the receptacle opening to retain the electrode on the shock generator in position to engage the animal. An enlarged stop portion is provided on each electrode intermediate the post portion and the fastener portion to limit insertion of the fastener portion into the respective receptacle opening on the electric shock generator.

An animal collar carries the electric shock generator on the animal with the electrodes of the shock generator positioned to engage the animal. For the purpose of mounting the electric shock generator on the collar, a pair of holes are provided on the collar in alignment with the receptacle openings in the electric shock generator.

A pair of insulative grommets are provided to space the electrodes from the collar at the collar holes. The grommets are dimensioned to respectively fit within the holes in the collar. Each grommet has a generally annular shape and includes a central hole to permit the passage of the fastener portion of the respective electrode therethrough.

In order to facilitate the mounting of the electric shock generator on the animal collar, a grommet support in the form of a flexible support strip is provided for holding the pair of grommets in proper position to respectively align with the pair of holes in the collar and with the receptacle openings in the electric shock generator. The grommets are held by the grommet holder in alignment with the respective holes in the collar to permit the grommets to be easily inserted into the respective holes in the collar and to thereafter enable the grommets to be retained in proper positions within the respective collar holes. The use of the grommet holder greatly facilitates the mounting of the electric shock generator on the collar. The grommet holder functions to hold the grommets in proper position within the collar holes thereby preventing the grommets from inadvertently falling out of the collar holes during assembly.

The grommets are also held by the grommet support in proper alignment with the receptacle openings in the electric shock generator to permit the fastener portions of the electrodes to be inserted through the respective grommets and into the respective receptacle openings of the electric shock generator. The insertion of the electrodes through the respective grommets and into the respective receptacle openings of the electric shock generator functions to capture the collar and the grommets between the stop portions of the electrodes and the electric shock generator so that the grommet support, the grommets, and the electric shock generator are thereby securely held on the collar. In the assembled collar arrangement, the grommets are held in place within the respective holes in the collar to insulate the electrodes from the collar. The grommets also function to reinforce the collar holes by reducing wear of the collar at the collar holes.

BRIEF DESCRIPTION OF THE DRAWINGS

The foregoing summary, as well as the following detailed description of the preferred embodiments of the present invention, will be better understood when read in conjunction with the accompanying drawings, in which.

DETAILED DESCRIPTION OF THE PREFERRED EMBODIMENTS

Figure 1:
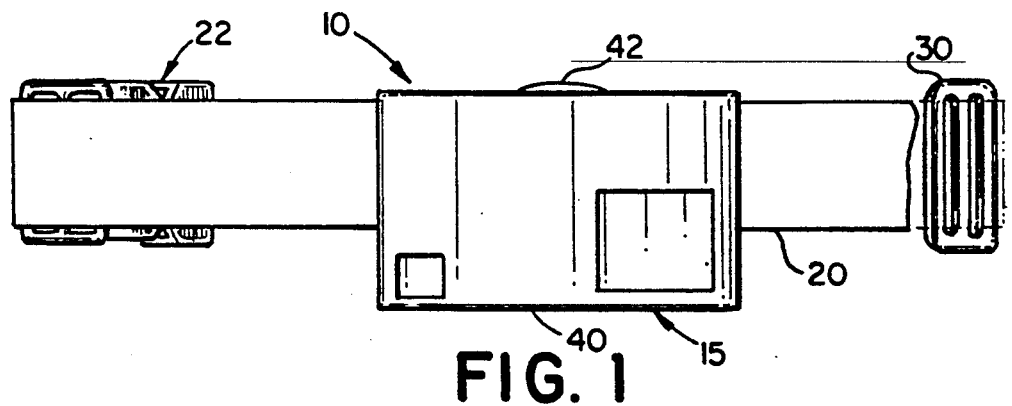
FIG. 1 is a front elevational view of an animal collar arrangement in accordance with the present invention in which a signal receiver having electric shock generator circuitry is carried on an animal collar, a portion of the collar being broken away to more clearly depict a glide element on the collar to permit length adjustment of the collar.
Figure 2:
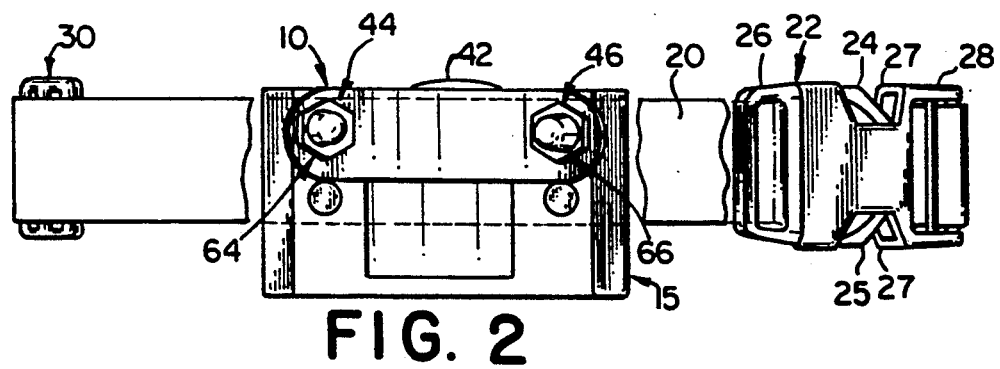
FIG. 2 is a rear elevational view of the animal collar arrangement shown in FIG. 1 with portions of the collar being broken away to more clearly show a side release buckle for opening and closing the collar and a back strip member mounted on the back of the signal receiver in accordance with the present invention.
Figure 3:
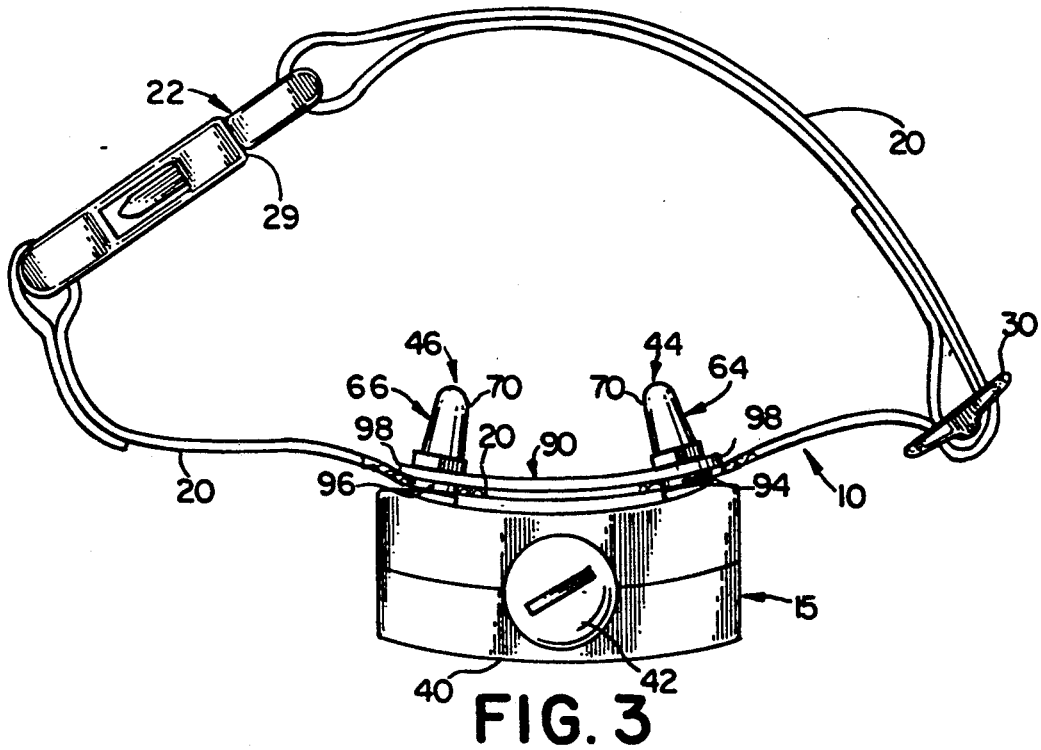
FIG. 3 is a top plan view of the animal collar arrangement shown in FIG. 1 with portions of the collar being broken away to more clearly depict a pair of bosses on the back strip member, the bosses serving as grommets for electrodes of the signal receiver.

Referring to the drawings, and initially to FIGS. 1-3, an animal collar arrangement, generally designated 10, is depicted. The animal collar arrangement 10 is employed as part of an electronic animal confinement system. The animal collar arrangement 10 is secured around an animal's neck where the collar arrangement 10 functions to administer an electric shock to the animal under predetermined conditions in order to control the movement of the animal.

In use, a conventional signal transmitter (not shown) having a conventional wire loop antenna (not shown) is employed as part of the electronic animal confinement system. The wire loop antenna is positioned at a designated area at which an animal is to be contained or confined. For example, when used with an outdoor system, the wire loop antenna may be placed upon the ground or buried slightly below the ground along the outer periphery of a desired confinement area such as a yard. For an indoor system, the wire loop antenna may similarly be used to surround a confinement area such as a room. Alternatively, the indoor antenna may be placed at a desired location within a room such as on or under a piece of furniture to deter the animal from approaching the selected piece of furniture. When the electronic animal confinement system is activated, the transmitter produces a low frequency signal, typically in a sub-broadcast band of frequencies such as approximately 10.75 Khz, over the wire loop antenna. For example, the transmitter may be of the type which has been sold by Invisible Fence Company, Inc. of Berwyn, Pa. under Model No. CT-4000 for use with an outdoor system or under Model No. AT-880 for use with an indoor system.

During operation, the animal collar arrangement 10 worn by the animal responds to the transmitted signal in the wire loop antenna whenever the animal moves within a selected distance from the wire loop antenna. Within the selected distance, the animal collar arrangement 10 responds to the transmitted signal by functioning to administer a slight electric shock to the animal to deter further movement of the animal toward the antenna.

In order to generate the electric shock, the animal collar arrangement 10 includes an electric shock generating signal receiver unit 15 responsive to the transmitted signal in the wire loop antenna for producing an electrical shock to the animal under the predetermined conditions to control the movement of the animal. The shock generating signal receiver unit 15 may be of the general type sold by Invisible Fence Company, Inc. of Berwyn, Pa. under Model No. R-6500.

The electric shock generator 15 is carried on a conventional animal collar 20 constructed of a suitable material such as nylon fabric or leather. So that the collar 20 can be opened and closed, the collar 20 includes a conventional side release buckle 22 molded from a suitable material such as a synthetic resinous material. The buckle 22 includes a fastening insert member 26 attached to one end of the collar and a cooperating catch member attached to the other end of the collar. In order to open the buckle 22, spring arms 24 and 25 on the fastening insert member 26 must be squeezed together at corresponding side openings 27 of the catch member 28. Squeezing the spring arms 24 and 25 together causes the buckle 22 to release so that the fastening insert member 26 may be pulled out of engagement with the catch member 28 of the buckle.

To secure the open collar around the neck of an animal, the fastening insert member 26 may be pushed into the free end 29 of the catch member 28. The catch member 28 causes the spring arms 24 and 25 of the fastening insert member to compress together. When the fastening insert member 26 is fully inserted into the catch member 28, the spring arms 24 and 25 spring apart into the side openings 27 of the catch member thereby snapping the buckle closed.

In order to properly fit the collar around the neck of the animal, the collar includes a glide element 30 in the form of a triglide constructed of a suitable material such as a molded synthetic resinous material or a die-cast zinc metal. For size adjustment, the glide element 30 may be moved along the collar 20 to increase or decrease the length of the collar. Sliding of the glide element 30 along the collar 22 permits the collar to be easily adjusted to a suitable size for a particular animal.

The electric shock generator 15 carried on the collar 20 includes an outer casing 40 constructed from a suitable synthetic resinous material such as molded glass-filled polycarbonate. The casing 40 includes a screw cap 42, as best shown in FIG. 3, for enclosing an internal battery chamber.

Figure 4:
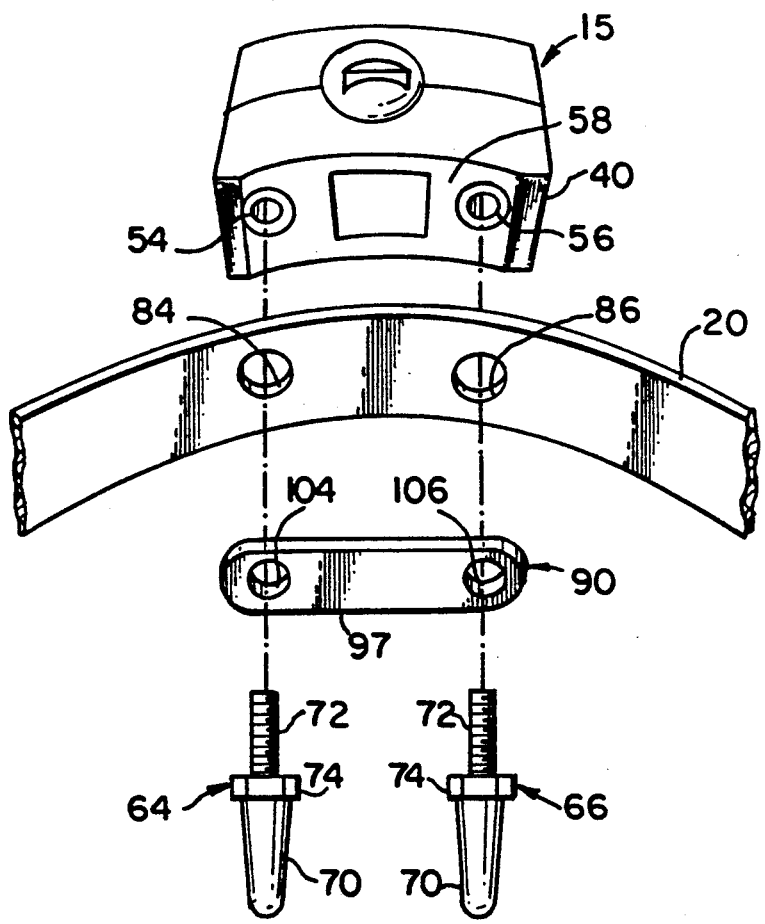
FIG. 4 is an exploded schematic rear perspective view of the signal receiver, the back strip member, and a fragment of the collar showing the manner in which the back strip member is mounted with the signal receiver onto the collar by screw-type electrodes which are schematically depicted in plan view.

A pair of output terminals, generally designated 44 and 46, are provided on the electric shock generator 15 for transmitting the electric shock produced by the electric shock generator to the animal. As best shown in FIG. 4, each output terminal includes a respective electrically-conductive receptacle opening 54 and 56 in the shock generator. The receptacle openings 54 and 56 are provided in the back surface 58 of the casing 40 of the electric shock generator 15 so that the receptacle openings 54 and 56 can be oriented toward the animal when the shock generator is mounted on the collar 20. The receptacle openings 54 and 56 are preferably threaded.

The output terminals of the electric shock generator 15 also respectively include electrically-conductive electrodes, generally designated 64 and 66, constructed of an electrically-conductive metal such as stainless steel. The use of stainless steel inhibits rusting of the exposed surfaces of the electrodes 64 and 66. In order to permit the shock generator 15 to be removably mounted on the collar 15 by the electrodes 64 and 66, such electrodes 64 and 66 are insertable into and removable from the respective receptacle openings 54 and 56.

As shown in FIG. 4, each of the electrodes 64 and 66 respectively includes an external post portion 70 having a generally frusto conical shape with a domed tip for engaging the animal to transmit the electrical shock produced by the electric shock generator 15 to the animal. Each electrode 64 and 66 also includes a fastener portion 72 for insertion into its respective receptacle opening 54 and 56 to retain the electrode on the shock generator in position to engage the animal. Preferably, the fastener portion 72 of each electrode includes screw-type threads to permit the electrodes 64 and 66 to be screwed in and out of the respective threaded receptacle openings 54 and 56. Each electrode 64 and 66 also includes an enlarged stop portion 74 positioned longitudinally intermediate the post portion 70 and the fastener portion 22. The stop portion 74 of each electrode has the general shape of an enlarged hexagonal bolt head to limit insertion of the fastener portion of the electrode into its respective receptacle opening on the shock generator.

As shown in FIG. 4, the animal collar 20 includes a pair of holes 84 and 86 which are spaced apart from one another along the length of the collar in position to align with the respective receptacle openings 54 and 56 in the electric shock generator 40. During mounting of the shock generator 15 on the collar, it is preferable for the holes 84 and 86 in the collar to respectively register with the receptacle openings 54 and 56 in the shock generator without undue tension or slack on the portion of the collar between the holes 84 and 86. Preferably, the holes 84 and 86 in the collar 20 will respectively align with the receptacle openings 54 and 56 when the collar is loosely held against the back surface 58 of the shock generator.

In operation, the animal collar arrangement 10 may be worn by the animal in all types of weather including rain and snow. In order to prevent wetness or moisture on the collar from inadvertently shorting the electrodes 64 and 66, electrical insulation is provided between the collar and the electrodes. Reinforcement of the holes 84 and 86 in the collar is also desirable to prevent undue wear or even tearing of the collar at the collar holes 84 and 86. Without reinforcement, the holes 84 and 86 in the collar may have a tendency to become larger and larger over time, particularly when a nylon collar is used, due to the rubbing of the collar against the threaded fastener portions 72 of the electrodes at the collar holes 84 and 86.

Figures 5, 6:
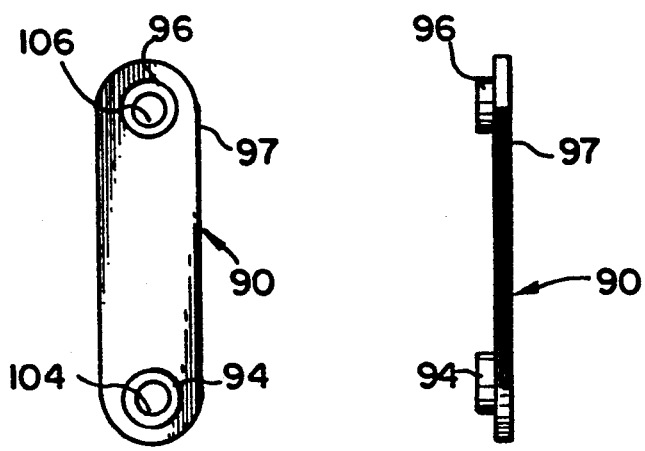
FIG. 5 is an enlarged front elevational view of the back strip member in accordance with the present invention.
FIG. 6 is an enlarged side elevational view of the back strip member shown in FIG. 5.

For the dual purpose of reinforcing the collar holes 84 and 86 and insulating the electrodes from the collar, a back strip member, generally designated 90, is employed. The back strip member 90 is molded from a suitable electrically-insulative material such as a synthetic resinous material like polypropylene. As best shown in FIGS. 5 and 6, the back strip 90 is molded as a single piece unit in which a pair of generally annular-shaped bosses 94 and 96 are fixed to a flexible elongated support strip 97. The bosses 94 and 96 project from the support strip 97 to serve as grommets for respectively reinforcing and insulating the holes 84 and 86 in the collar 20. For this purpose, each of the bosses 94 and 96 is generally annular in shape and is dimensioned to loosely fit within a respective one of the holes 84 and 86 of the collar. The outer diameter of each of the boss-like grommets 94 and 96 is slightly smaller than the diameter or width of the corresponding holes 84 and 86 in the collar. The grommets 94 and 96 also have a sufficient depth from the support strip 97 to permit the grommets to loosely fill and thereby plug the holes 84 and 86 in the collar 20. The depth of projection of each grommet 94 and 96 from the support strip 97 is approximately equal to the thickness of the collar. Each grommet 94 and 96 also includes a central hole 104 and 106, respectively, to permit the passage of the fastener portion 72 of respective electrodes 64 and 66 therethrough.

The support strip 97 of the back strip member 90 serves as a grommet support for holding the pair of grommets 94 and 96 in proper position to respectively align with the pair of holes 84 and 86 in the collar 20. Alignment of the grommets 94 and 96 with the respective holes 84 and 86 in the collar permits the grommets to be easily inserted into the respective collar holes 84 and 86 as the back strip member 40 is pressed against the inner surface of the collar 15.

As best shown in FIG. 4, the boss-like grommets 94 and 96 are also properly positioned on the grommet support strip 97 to respectively align with the receptacle openings 54 and 56 in the electric shock generator 40. This alignment permits the fastener portions 72 of the respective electrodes 64 and 66 to be passed through the central holes 104 and 106 in the respective grommets 94 and 96 and inserted into the respective receptacle openings 54 and 56. In order to facilitate assembly, the support strip 97 has sufficient flexibility to permit bending of the strip 97 in order to achieve more precise alignment of the grommets 94 and 98 with the corresponding receptacle openings 54 and 56 in the back surface 58 of the shock generator 15.

During assembly, the back strip member 90 is positioned relative to the collar so that the grommets 94 and 96 can be inserted into the receptive collar holes 84 and 86. The grommets 94 and 96 are dimensioned to telescope through the collar holes 84 and 86 as the back strip member 90 is pressed against the inner surface of the collar in proper position so that the grommets 94 and 96 are in proper alignment with the corresponding collar holes. The back strip member 90 is then held firmly against the collar so that the support strip 97 functions to retain the grommets 94 and 96 in proper position loosely plugging the respective collar holes 84 and 86. The back strip member 90, while held against the collar 20, can then be positioned relative to the back surface 58 of the electric shock generator 15 so that the grommets are oriented toward the back surface of the shock generator and the grommet holes 104 and 106 respectively align in proper registry with the receptacle openings 54 and 56 in the electric shock generator. When in proper position, the back strip member 90 and the collar 20 are then held against the back surface 58 of the electric shock generator so that the grommet holes 104 and 106 properly register with receptacle openings 54 and 56. The electrodes 64 and 66 are then placed into position. The threaded fastener portion 72 of one of the electrodes 64 is inserted through the respective grommet hole 104 in the back strip member and into its respective receptacle opening 54. The electrode 64 is then screwed into position on the back surface of the shock generator 15. The remaining electrode 66 is likewise screwed into position.

As each of the electrodes 64 and 66 is tightly screwed into place, the enlarged hexagonal stop portion 74 of the electrode bears against the back surface of the back strip member 90 until the boss-like grommet on the front surface of the back strip member is forced into tight engagement with the back surface 58 of the casing 40 around the respective receptacle opening. When both electrodes are screwed into place, the collar 15 and the grommets 94 and 96 are captured between the enlarged hexagonal stop portions 74 of the electrodes and the back surface 58 of the electric shock generator to thereby retain the grommet support strip 97, the grommets 94 and 96, and the electric shock generator 15 on the collar 20. The use of a back strip member 90 having a support strip for holding the grommets in proper position during assembly greatly facilitates collar mounting.

In assembled arrangement, the respective grommets 94 and 96 are respectively held within the holes 84 and 86 of the collar to separate the respective electrodes 64 and 66 from the collar. The annular-shaped grommets 94 and 96 prevent any contact between the electrodes inserted through the grommet holes 104 and 106 and the portions of the collar 20 surrounding collar holes 84 and 86 outside of the grommets 94 and 96. The grommets 94 and 96 thereby insulate the electrodes from the collar at the collar holes.

As best shown in FIG. 3, the support strip 97 is also dimensioned so that the ends 98 of the support strip 97 extend longitudinally beyond the grommets a sufficient distance to prevent the collar from inadvertently lapping back and touching the exposed post portions 70 of the respective electrodes 64 and 66 during use. The ends 98 of the support strip 97 longitudinally overhang the respective grommets 94 and 96 to shield the post portions 70 of the respective electrodes 64 and 66 from contract with the collar during movement of the animal. The grommets also serve to reinforce the openings 84 and 86 in the collar by preventing the collar 20 from rubbing against the screw-type threads of the fastener portions 72 of the respective electrodes 64 and 66. The generally cylindrical outer surface of each grommet 94 and 96 which contacts the portions of the collar at collar holes 84 and 86 is generally smooth to reduce wear and tear of the collar at the collar holes 84 and 86.

From the foregoing description, it can be seen that the present invention provides an animal collar arrangement having a back strip member which is configured to facilitate assembly of the shock generator onto the collar while providing grommets to reinforce openings in an animal collar. The grommets also function to electrically insulate the animal collar from electrodes of the electric shock generator carried on the collar. It should be recognized, however, by those skilled in the art, that changes or modifications may be made to the above-described embodiments without departing from the broad inventive concepts of the invention. It should be understood, to particular embodiments disclosed herein, but is intended to cover all modifications and changes which are within the scope and spirit of the appended claims.

What is claimed is:

1. An animal collar arrangement including:
   A. an electric shock generator for producing an electrical shock to an animal under predetermined conditions to control the movement of the animal, the electric shock generator having a pair of output terminals for transmitting the electric shock to the animal, each output terminal including a receptacle opening in the shock generator and an electrode removably insertable into the receptacle opening, the electrode including an external post portion for engaging the animal to transmit the electrical shock to the animal, a fastener portion for insertion into the receptacle opening to retain the electrode on the shock generator in position to engage the animal, and a stop portion intermediate the post portion and the fastener portion to limit insertion of the fastener portion into the receptacle opening;
   B. a collar for the animal for carrying the electrical shock generator so that the post portions of the electrodes are positioned to engage the animal, the collar having a pair of holes positioned to align with the receptacle openings in the shock generator;
   C. a pair of grommets dimensioned to respectively fit within the pair of holes in the collar, each grommet having a hole to permit the passage of the fastener portion of the electrode through the grommet; and
   D. a grommet support for holding the pair of grommets in proper position (1) to respectively align the pair of grommets with the pair of holes in the collar to permit the grommets to be inserted into the respective holes in the collar and (2) to respectively align the pair of grommets with the receptacle openings in the electric shock generator to permit the fastener portions of the electrodes to be passed through the respective grommets and inserted into the respective receptacle openings so that the collar and the grommets are captured between the stop portions of the electrodes and the electric shock generator to thereby retain said grommet support, said grommets, and said electric shock generator on the collar with the grommets being respectively held within the holes in the collar to space the respective electrodes away from the collar at the holes in the collar.

2. The animal collar arrangement in accordance with claim 1 wherein the pair of grommets are affixed to the grommet support.

3. The animal collar arrangement in accordance with claim 2 wherein the pair of grommets and the grommet support are a one-piece unit.

4. The animal collar arrangement in accordance with claim 3 wherein the one-piece unit comprises a synthetic resinous material.

5. The animal collar arrangement in accordance with claim 4 wherein the synthetic resinous material comprises polypropylene.

6. The animal collar arrangement in accordance with claim 1 wherein the grommet support includes a support strip for holding the grommets.

7. The animal collar arrangement in accordance with claim 6 wherein the support strip is sufficiently flexible to permit bending of the support strip to facilitate alignment of the grommets with the holes in the collar and with the receptacle openings in the shock generator.

8. The animal collar arrangement in accordance with claim 6 wherein the support strip is of a sufficient length to extend beyond and overhang the grommets.

9. The animal collar arrangement in accordance with claim 6 wherein the pair of grommets and the support strip are a one-piece unit.

10. The animal collar arrangement in accordance with claim 9 wherein the one-piece unit comprises a synthetic resinous material.

11. The animal collar arrangement in accordance with claim 10 wherein the synthetic resinous material comprises polypropylene.

12. The animal collar arrangement in accordance with claim 6 wherein each of the grommets has a generally annular shape.

13. The animal collar arrangement in accordance with claim 1 wherein the grommets comprise an electrically-insulative material to insulate the electrodes from the collar at the holes in the collar.

14. The animal collar arrangement in accordance with claim 13 wherein said grommets include generally smooth outer surfaces for contacting the collar at the holes in the collar to inhibit wear on the collar at the holes in the collar.

15. The animal collar arrangement in accordance with claim 14 wherein the grommet support includes a support strip for holding the grommets.

16. The animal collar arrangement in accordance with claim 15 wherein the support strip is sufficiently flexible to permit bending of the support strip to facilitate alignment of the grommets with the holes in the collar and with the receptacle openings in the shock generator.

17. The animal collar arrangement in accordance with claim 16 wherein the pair of grommets and the support strip are a one-piece unit.

18. The animal collar arrangement in accordance with claim 17 wherein the one-piece unit comprises a synthetic resinous material.

19. The animal collar arrangement in accordance with claim 18 wherein each of the grommets has a generally annular shape.

20. The animal collar arrangement in accordance with claim 17 wherein the support strip is of a sufficient length to extend beyond and overhang the grommets.

* * * * *